United States Patent
Duch et al.

(10) Patent No.: US 6,735,237 B2
(45) Date of Patent: May 11, 2004

(54) DEVICE FOR PRODUCING A GLASS MELT

(75) Inventors: Klaus-Dieter Duch, Bingen (DE); Frank Karetta, Dittelsheim-Hessloch (DE); Franz Ott, Mitterteich (DE); Siegfried Breitfelder, Jena (DE)

(73) Assignee: Schott Glas, Mainz (DE)

( * ) Notice: Subject to any disclaimer, the term of this patent is extended or adjusted under 35 U.S.C. 154(b) by 40 days.

(21) Appl. No.: 10/009,929

(22) PCT Filed: Mar. 30, 2001

(86) PCT No.: PCT/EP01/03656

§ 371 (c)(1),
(2), (4) Date: Feb. 4, 2002

(87) PCT Pub. No.: WO01/77034

PCT Pub. Date: Oct. 18, 2001

(65) Prior Publication Data

US 2002/0159497 A1 Oct. 31, 2002

(30) Foreign Application Priority Data

Apr. 5, 2000 (DE) .......................... 100 16 872

(51) Int. Cl.⁷ .............................. C03B 5/027
(52) U.S. Cl. ...................... 373/33; 373/35; 373/41
(58) Field of Search .............. 373/29–33, 35, 373/41; 65/99 A, 100, 99 R, 135, 65, 42, 183, 164, 327, 329

(56) References Cited

U.S. PATENT DOCUMENTS

| 2,902,524 A | * | 9/1959 | Paxton ........................ 373/30 |
| 2,919,297 A | * | 12/1959 | Augsburger ................. 373/30 |
| 3,489,547 A | * | 1/1970 | Plumat ........................... 373/30 |
| 4,149,022 A | | 4/1979 | Hrycik ............................. 13/6 |
| 4,410,997 A | | 10/1983 | Gell et al. ...................... 373/35 |
| 4,426,217 A | * | 1/1984 | Farrar et al. ................. 65/136 |

FOREIGN PATENT DOCUMENTS

| DE | 1 080 740 | 4/1960 |
| DE | 29 17 386 | 11/1979 |

* cited by examiner

Primary Examiner—Tu Ba Hoang
(74) Attorney, Agent, or Firm—Baker & Daniels

(57) ABSTRACT

The invention relates to a device for the production of a glass melt from a batch; with a melt tank (1) that has peripheral walls (1.1–1.4) and a bottom (1.5); with a discharge channel (2) which is located under the bottom (1.5) of the melt tank (1) and which is in conducting connection with the melt bath (3) over an entry opening (2.3) and has an outlet opening (2.4) for the finished melt in the zone of a peripheral wall (1.1) of the melt tank (1); with at least one heating arrangement for the heating of the melt bath (3); the entry opening (2.3) of the discharge channel (2) is arranged in a central zone of the bottom (1.5) of the melt tank (1); the discharge channel (2) has a covering (2.2) which is located at least approximately at the level of the bottom (1.5) of the melt tank (1).

12 Claims, 4 Drawing Sheets

DEVICE FOR PRODUCING A GLASS MELT

BACKGROUND OF THE INVENTION

1. Field of the Invention

The invention relates to a device for the production of a glass melt from a batch.

2. Description of the Related Art

Such a device for the production of a glass melt is mostly of rectangular ground plan. It has peripheral walls as well as a bottom. It is equipped, furthermore, with an electric heating system. Here there can also be provided several heating circuits. The heating-up occurs over electrodes. There takes place here a direct current flow through the conductive glass melt.

Under the bottom of the melt tank there is located a draw-off channel. The draw-off channel is fully open toward the melt bath. The channel runs essentially horizontally, and therewith in a plane parallel to the melt surface. It has an outlet which is located in the region of one of the side walls of the melt tank.

In operation the glass melt is always covered by a cold batch layer or "batch blanket". The tank, therefore, is also designated as a "cold top melt tank". There, heed is taken that the surface of the glass melt is always covered by batch. At the edges of the melt surface, i.e. on the peripheral walls, however, as a rule a so-called glow strip is left open that serves for the de-gassing of the melt. This can be controlled over an charging machine. The batch layer lying on the glass melt has, namely, an insulating effect. If the batch layer is not closed, there occur heat radiations, which means losses of energy. Mixture, accordingly, is always supplied in a corresponding amount.

For the achieving of a faultless quality it is absolutely indispensable that through the draw-off channel molten and refined (bubble-free) glass emerges and that still unmelted batch is not carried along. Even small quantities of unmelted or only initially molten batch are unacceptable in respect to the glass quality to be achieved.

All strivings are being undertaken in this direction. To this there belongs inter alia the correct arranging of the heating circuits and of the appertaining electrodes, as well as the bringing-in of a sufficiently high electric power. Despite these measures it does occur that unmolten or only insufficiently melted batch as well as incompletely refined glass passes through the draw-off channel with the flow of the glass melt, which is extremely troublesome in the further processing and results in an unsatisfactory quality of the glass.

DE 1 080740 B describes a device for the production of a glass melt from a batch, in which the heated melt tank has a draw-off channel the entry opening of which is arranged in the region of the bottom of the melt tank. The draw-off channel is located under the bottom of the melt tank and has an outlet opening in the zone of a peripheral wall. There the draw-off channel in at least two corners is brought directly onto the wall of the tank.

U.S. Pat. No. 4,410,997 A describes a device for the production of a glass melt from a mixture. Here too, the heated melt tank has a draw-off channel which runs in a central zone of the tank bottom. There, no covering is provided.

DE 29 17 386 A likewise describes a melt tank with a draw-off channel which proceeds from the bottom zone of the tank. A covering of the draw-off channel is not provided here.

Underlying the invention is the problem of constructing a melt tank of the type described in such manner that there is guaranteed a complete melting-up of the batch as well as a complete refining of the glass, and that not even the smallest batch components and bubble-infected glass pass into the draw-off channel and, together with the rest of the glass flow, pass through its outlet opening.

BRIEF SUMMARY OF THE INVENTION

The inventors have perceived the following:

The draw-off channel mentioned, open toward the melt bath, is located outside of the main zone of the electric heating. There the flow velocities arising are comparatively low. Here the glass of the glass melt can dead-melt in certain zones. In the zone of the peripheral wall in which also the outlet is located, a predominantly downward directed flow builds up. Through this flow it is possible that incompletely melted-up mixture or incompletely refined glass will enter directly into the removal flow in the draw-off channel and will cause the disadvantageous consequences mentioned.

For the solution of the problem the inventors propose the four following courses of solution, which can be applied in each case alone or in combination.

The first course of solution consists in the following:

The draw-off channel is covered on a part of its extent. There remains only an opening that is located in the zone of action of the heating circuits. In general this entry opening into the draw-off channel will be arranged in a central zone of the tank bottom. The tank bottom, therefore—except for the entry opening into the draw-off channel—is simultaneously the covering of the draw-off channel. One could also say that the channel is largely covered. The covering extends from the zone of its outlet opening to a central zone of the tank bottom, purposefully, however, at least up to a tenth of the distance between two oppositely lying peripheral walls of the melt tank.

There is thereby prevented the possibility that incompletely melted-up batch components as well as bubble-infected glass will be able to pass out of the zone of the tank over the channel, directly into the channel and therewith into the removal flow. In this manner there can be achieved a perfect glass quality, provided that all the other parameters are in order.

As material for the covering mentioned—i.e. the partition between the glass melt and the channel—there come into consideration fireproof materials (metallic or nonmetallic) with low corrosion, high endurance, low costs and a low glass-fault potential. Here there offer themselves refractory metals such as molybdenum or tungsten as well as their alloys.

The second course of solution consists in the following:

a covering is provided, for example of the material of which also the tank consists. The covering covers off a part of the surface of the melt surface. The melt surface is therewith reduced. This leads to a favorable influencing of the glass flow, since the heat lead-off over the covering is less than over the mixture cover, and since therewith a thermal barrier is built up underneath the covering. Thereby there is prevented the possibility that incompletely melted-up batch of incompletely refined glass can be directly into the removal flow. In this manner incompletely melted-up batch constituents remain longer in the melt tank and are completely melted up and refined. The result is the same as with the first course of solution.

The third course of solution consists in providing an additional heating in the zone of the draw-off channel, and namely in the zone above the draw-off channel where the glass flow leaves the tank. The effect of this additional heating lies in the build-up of a thermal barrier, by which there is prevented the possibility that incompletely melted-up batch or incompletely refined glass can pass directly into the removal flow.

The fourth course of solution consists in installing a heated dome (heated by burners for example) and in not laying in any batch in this zone. There, accordingly, a blank glass surface is established through which energy can enter into the glass bath from the heated dome. As in the second and third courses of solution, therewith a thermal barrier is built up, by which there is prevented the possibility that incompletely melted-up batch or incompletely refined glass can pass directly into the removal flow. By all four solutions, accordingly, there is guaranteed a complete melting-up of the batch and a sufficient refining of the glass melt. There is prevented the possibility that any batch particles that are incompletely melted up, or any bubble-contaminated glass will pass into the draw-off and thus leave the melt tank with the glass flow.

BRIEF DESCRIPTION OF THE DRAWINGS

The invention and also the state of the art are explained in detail with the aid of the drawing. Therein there is especially represented the following.

Figure 1:
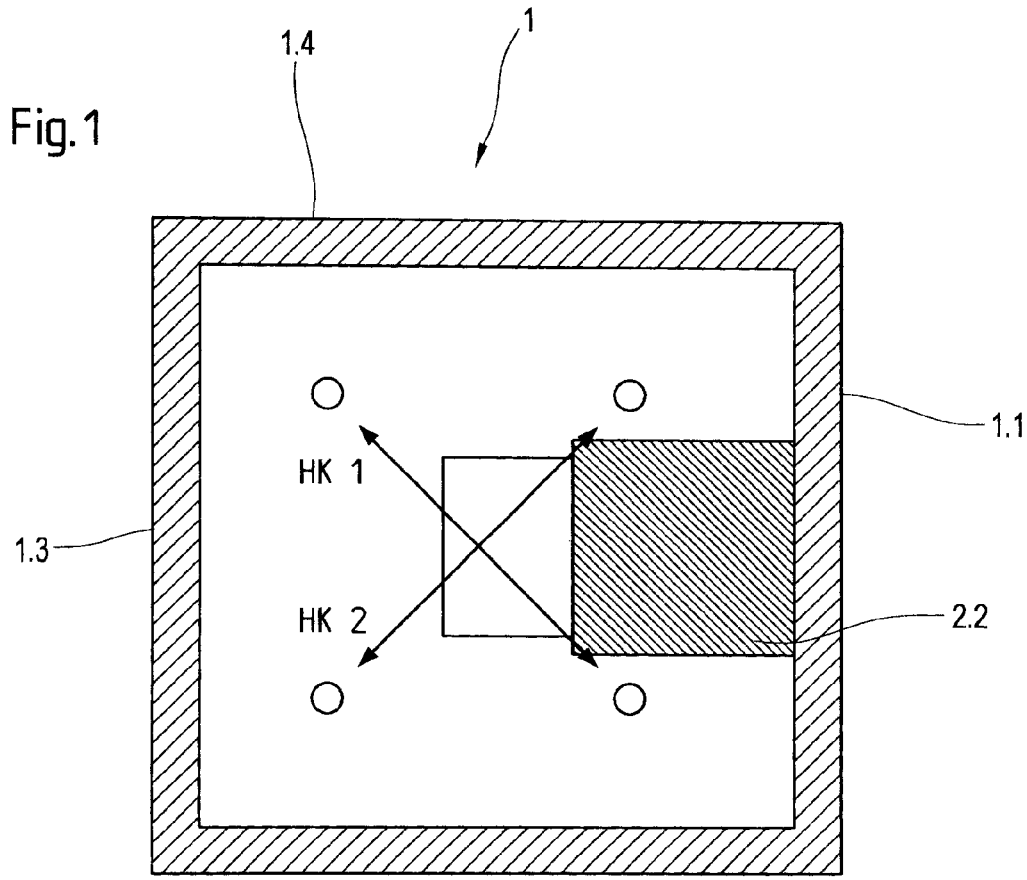
FIG. 1 shows a device for the production of a glass melt according to the invention, in plan view, and namely according to the first course of solution.
Figure 2:
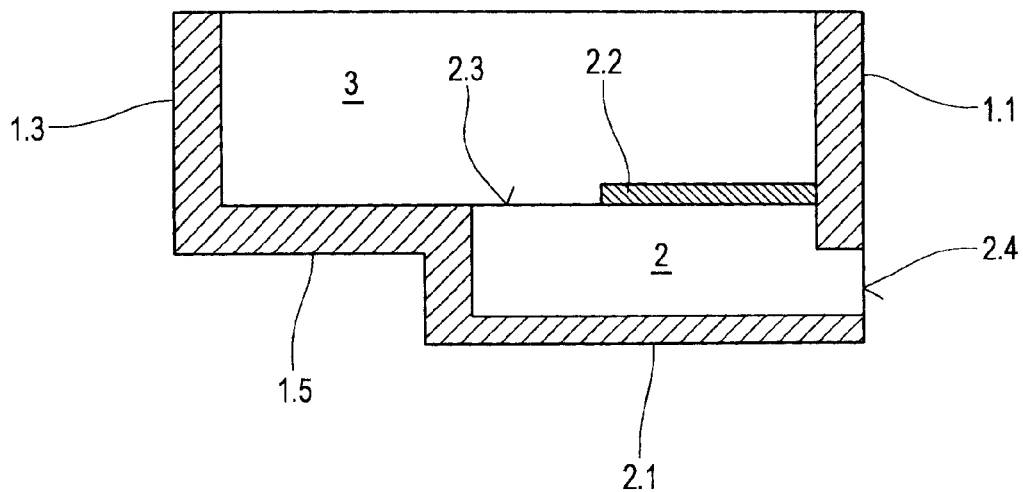
FIG. 2 shows the device for the production of a glass melt according to FIG. 1, in a vertical section.

The device according to the invention represented in FIGS. 1 and 2 comprises a melt tank 1. This tank is rectangular. It has four peripheral walls 1.1 to 1.3, further a bottom 1.5.

The tank is electrically heated, for example by two heating circuits HK1 and HK2. These heating circuits couple the necessary heating energy to be generated into the glass melt 3.

Under the bottom there is present a discharge channel 2.

The discharge channel 2 likewise has a bottom 2.1. The bottom runs horizontally in the example of execution represented. The channel is covered on its upper side by a covering 2.2. As one sees, the covering 2.2 is located about at the level of the bottom 1.5. It connects to the peripheral wall 1.1 of the melt tank 1 and extends to about a third of the distance between the peripheral walls 1.1 and 1.3. By reason of the formation and arrangement of the covering 2.2, relatively to the bottom 1.5, there remains an opening 2.3. This is the entry opening through which glass melt passes from the space enclosed by the melt tank 1 proper into the discharge channel 2. The discharge channel 2 has an outlet opening 2.4. As one sees, this is located in the zone of the peripheral wall 1.1 of the melt tank 1.

The energy of the heating circuits engages the major part of the melt bath 3. There a convection occurs, which engages also the remote angles of the melt tank interior space. Accordingly, only glass in fully melted-up and refined form passes through the entry opening 2.3 and into the discharge channel 2, and therewith through its outlet opening 2.4 for further processing.

In the form of execution represented in FIGS. 3 and 4 one again perceives a melt tank 1 with its peripheral walls 1.1, 1.2, 1.3, 1.4. Also there are again assigned two heating circuits HK1 and HK2 which couple the heating energy into the glass melt 3 to be generated.

According to the invention a covering 4 is provided. The covering consists in this case of stones of fireproof material. The covering extends over the entire length of the peripheral wall 1.1, between the two peripheral walls 1.3 and 1.4. They plunge in part into the melt bath 3, and in part they protrude from the melt bath over its surface 3.1.

The covering 4, however, can also have another form. It does not have to extend over the entire peripheral wall 1.1. It can also extend along others of the peripheral walls, so that the area of the surface 3.1 is still more strongly reduced than is represented here. Furthermore, the covering 4 does not absolutely have to plunge into the melt bath 3. A contact with the surface 3.1 is sufficient. There could even remain a certain distance between the under-edge of the covering and the surface 3.1.

Figure 5:
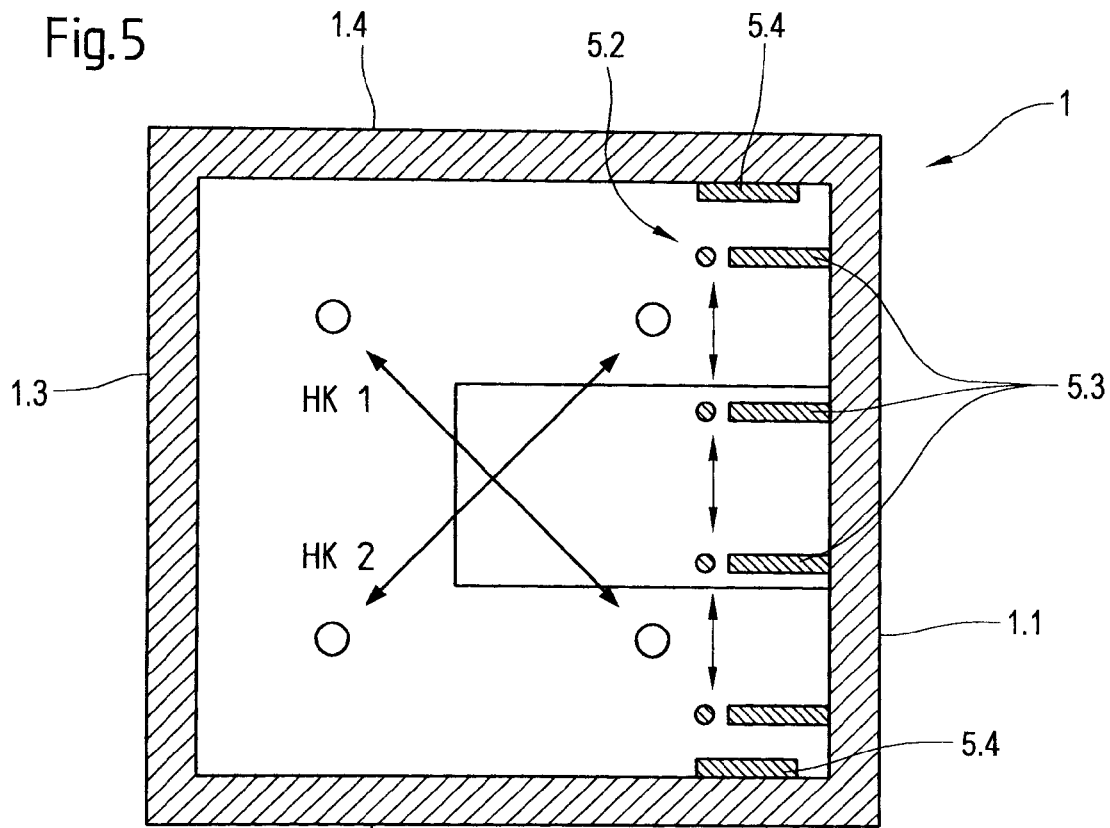
FIG. 5 shows a further device for the production of a glass melt according to the third course of solution.
Figure 6:
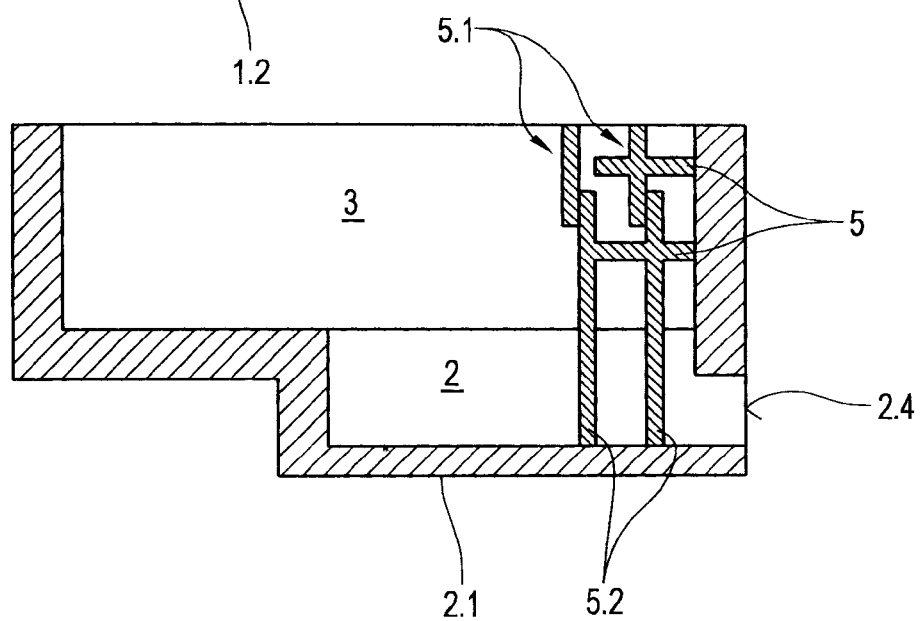
FIG. 6 shows the object of FIG. 5 in a vertical section.

In the form of execution according to FIGS. 5 and 6 again in the zone of the peripheral wall 1.1 of the tank 1, special heating stretches 5 are provided in addition to the heating circuits HK1 and HK2, One perceives, therefore, in FIG. 6 bar electrodes 5.1 as top electrodes. One perceives, further, bar electrodes 5.2 as bottom electrodes. Further there are provided bar electrodes 5.3 as side electrodes, that directly adjoin the peripheral wall 1.1. Finally one perceives on the peripheral wall 1.2 and on the peripheral wall 1.4 in each case a plate electrode 5.4. The electrode types 5.1 to 5.4 can be used alternatively or in combination. There a single electrode series can be provided, but also several electrode series.

Spatial expansion of the zone that is additionally heated:
Glass flow direction: 5 to 50% of the tank length, preferably 5 to 25%.
Transversely to the glass flow direction: at least the zone over the channel must be influenced, up to the total tank width
Height: 10 to 100% of the melt basis height, proceeding from the theoretical glass line, preferably 10 to 50%.
Execution of the heating stretches:
Electrodes: bar, plate, block, cap
Installation: Side electrodes (side walls or rear walls), top electrodes, bottom electrodes (wherein height 10 to 100% of glass stand, preferably 50 to 80%)
with bar electrodes: also at an angle unequal to 90° to the wall.

Figure 3:
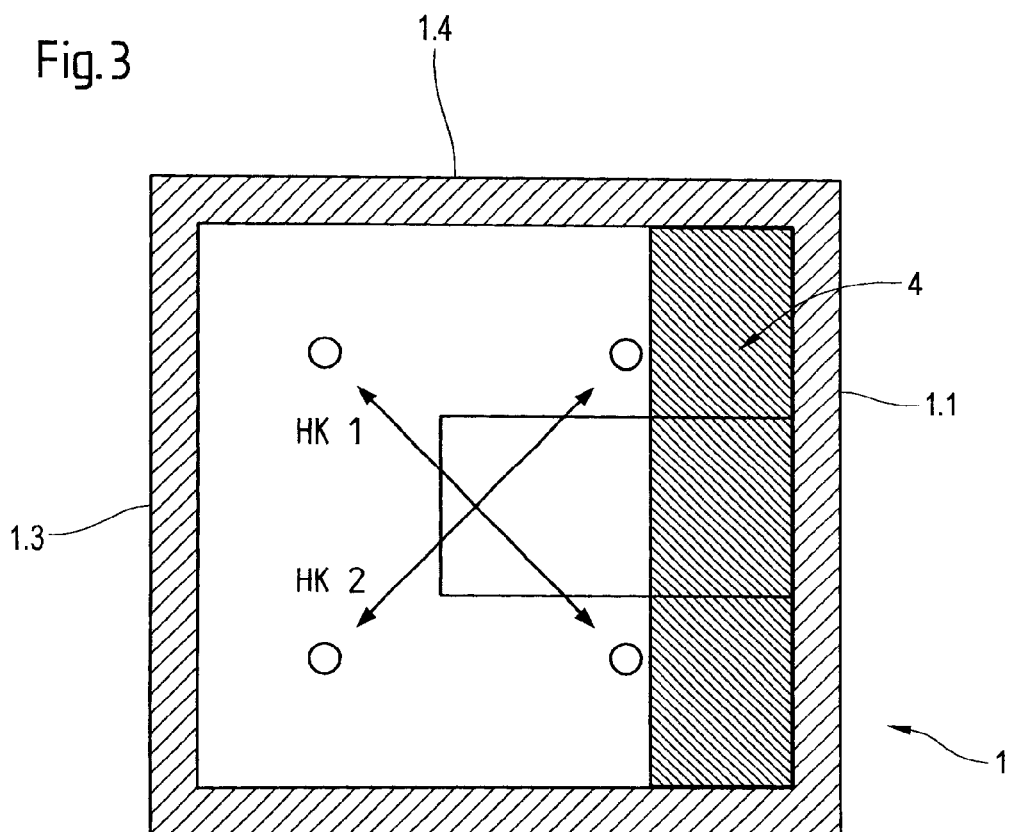
FIG. 3 shows a further device for the production of a glass melt, and namely according to the second course of solution.
Figure 4:
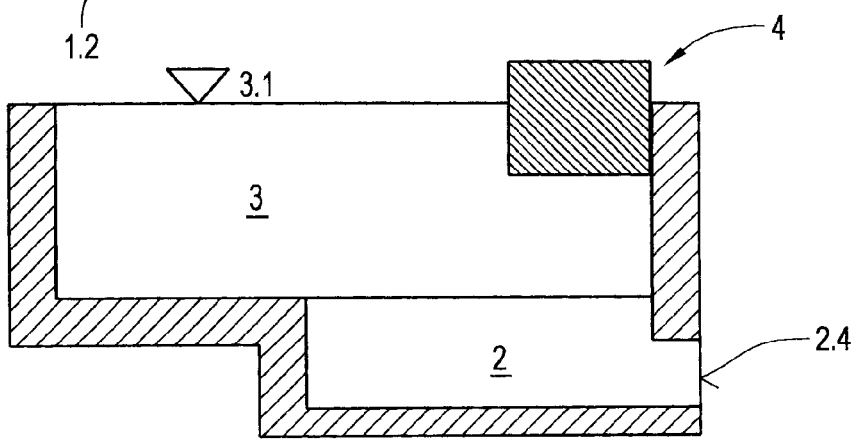
FIG. 4 shows the object of FIG. 3 in a vertical section.
Figure 7:
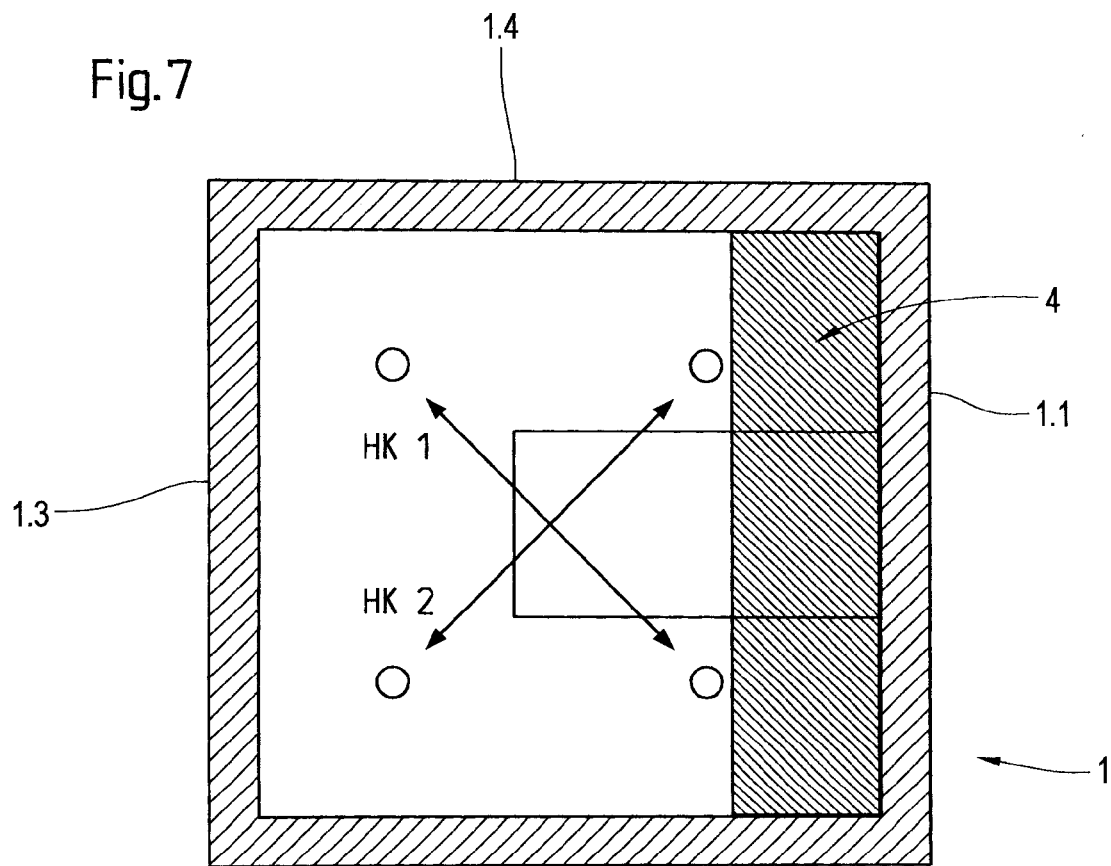
FIG. 7 shows a device for the production of a glass melt according to the fourth course of solution.
Figure 8:
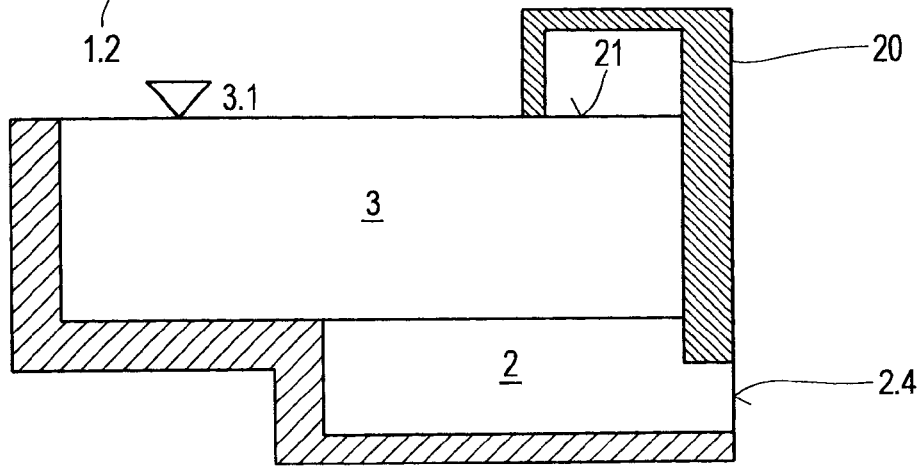
FIG. 8 shows the object of FIG. 7 in a vertical section.

FIGS. 7 and 8 show an arrangement similar to that according to FIGS. 3 and 4. Here, however, a heated dome 20 is provided. This provides that a blank glass surface 21 remains. In this zone no batch is laid in.

What is claimed is:

1. A device for producing a glass melt from an un-melted glass batch, comprising:
   a melt tank having peripheral walls and a bottom wall defining a melt tank interior, said bottom wall including a discharge channel in fluid flow communication with said melt tank interior, said discharge channel including an inlet opening disposed centrally within said tank, and an outlet opening disposed proximate one of said peripheral walls;
   a melt bath disposed within said melt tank interior, said melt bath having a surface including a layer of un-melted glass batch;
   a heating arrangement including at least one electrode conducting electric current into said melt bath to heat said melt bath; and a cover member separate from said bottom wall, said cover member mounted within said melt tank substantially level with at least a portion of said bottom wall and covering at least a portion of said discharge channel, said cover member and said bottom wall together defining said inlet opening.

2. The device of claim 1, wherein said inlet opening of said discharge channel is disposed proximate said at least one electrode.

3. The device of claim 1, wherein said melt tank is rectangular in shape.

4. The device of claim 2, wherein said melt tank is rectangular in shape.

5. A device for producing a glass melt, comprising:

a melt tank having peripheral walls and a bottom wall defining a melt tank interior, said bottom wall including a discharge channel in fluid flow communication with said melt tank interior, said discharge channel including an outlet opening disposed proximate one of said peripheral walls;

a melt bath disposed within said melt tank interior, said melt bath including a surface;

a heating arrangement including at least one electrode conducting electric current into said melt bath to heat said melt bath; and a cover member extending from at least one of said peripheral walls and disposed above said outlet opening of said discharge channel, said cover member in contact with at least a portion of said surface of said glass melt.

6. The device of claim 5, wherein said melt tank is rectangular in shape.

7. A device for producing a glass melt, comprising:

a melt tank having peripheral walls and a bottom wall defining a melt tank interior having a width, said bottom wall including a discharge channel in fluid flow communication with said melt tank interior, said discharge channel including an outlet opening disposed proximate one of said peripheral walls;

a melt bath disposed within said melt tank interior;

a heating arrangement including at least one electrode conducting electric current into said melt bath to heat said melt bath; and an auxiliary heating arrangement including a plurality of electrodes extending substantially across said width of said melt tank and disposed above said discharge channel.

8. The device of claim 7, wherein said plurality of electrodes of said auxiliary heating arrangement are selected from one or more of the group consisting of bar electrodes, plate electrodes, block electrodes, and cup electrodes.

9. The device of claim 7, wherein said melt tank is rectangular in shape.

10. The device of claim 9, wherein said melt tank is rectangular in shape.

11. A device for producing a glass melt, comprising:

a melt tank having peripheral walls and a bottom wall defining a melt tank interior, said bottom wall including a discharge channel in fluid flow communication with said melt tank interior, said discharge channel including an outlet opening disposed proximate one of said peripheral walls;

a melt bath disposed within said melt tank interior, said melt bath having a surface;

a heating arrangement including at least one electrode conducting electric current into said melt bath to heat said melt bath; and a dome member extending from at least one of said peripheral walls, said dome member defining an air space over only a portion of said surface of said melt which is disposed above said discharge channel and said outlet opening.

12. The device of claim 11, wherein said melt tank is rectangular in shape.

* * * * *